(12) United States Patent
Sanada et al.

(10) Patent No.: US 10,892,091 B2
(45) Date of Patent: Jan. 12, 2021

(54) PERMANENT MAGNET, MOTOR, AND GENERATOR

(71) Applicant: KABUSHIKI KAISHA TOSHIBA, Tokyo (JP)

(72) Inventors: Naoyuki Sanada, Kanagawa (JP); Shinya Sakurada, Tokyo (JP); Yosuke Horiuchi, Tokyo (JP); Masaya Hagiwara, Kanagawa (JP); Masaki Endo, Tokyo (JP); Takahiro Terada, Kanagawa (JP); Hideo Chikaoka, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 595 days.

(21) Appl. No.: 15/413,598

(22) Filed: Jan. 24, 2017

(65) Prior Publication Data
US 2017/0148568 A1 May 25, 2017

Related U.S. Application Data

(63) Continuation of application No. PCT/JP2015/001640, filed on Mar. 23, 2015.

(51) Int. Cl.
*H01F 41/02* (2006.01)
*C21D 1/26* (2006.01)
(Continued)

(52) U.S. Cl.
CPC .......... *H01F 41/0266* (2013.01); *B22F 3/003* (2013.01); *B22F 3/16* (2013.01);
(Continued)

(58) Field of Classification Search
CPC .. H01F 1/0536; H01F 1/0596; H01F 41/0266; B22F 2301/355; F27D 15/00; C21D 1/00
See application file for complete search history.

(56) References Cited

U.S. PATENT DOCUMENTS 6,749,699 B2   6/2004 Bogel et al.
2007/0000642 A1   1/2007 Yamazaki et al.
(Continued)

FOREIGN PATENT DOCUMENTS

CN   103913059   7/2014
EP   1594145   11/2005
(Continued)

OTHER PUBLICATIONS

International Search Report for International Patent Application No. PCT/JP2015/001640 dated Jun. 9, 2015, 5 pages.
(Continued)

*Primary Examiner* — Colleen P Dunn
*Assistant Examiner* — Sean P. O'Keefe
(74) *Attorney, Agent, or Firm* — Amin, Turocy & Watson, LLP

(57) ABSTRACT

A method of manufacturing a permanent magnet comprises a solution heat treatment. The solution heat treatment includes: performing a heat treatment at a temperature $T_{ST}$; placing a cooling member including a first layer and a second layer on the first layer between the heater and the treatment object so that the first layer faces the treatment object; and transferring the treatment object together with the cooling member to the outside of a heating chamber, and cooling the treatment object until a temperature of the treatment object becomes a temperature lower than a temperature $T_{ST}$–200° C. In the step of cooling the treatment object, a cooling rate until the temperature of the treatment object becomes the temperature $T_{ST}$–200° C. is 5° C./s or more.

4 Claims, 6 Drawing Sheets

(51) Int. Cl.
| | |
|---|---|
| *H01F 1/055* | (2006.01) |
| *B22F 3/00* | (2006.01) |
| *F27D 3/00* | (2006.01) |
| *B22F 3/16* | (2006.01) |
| *C22C 38/10* | (2006.01) |
| *C22C 38/14* | (2006.01) |
| *C22C 38/16* | (2006.01) |
| *H02K 1/02* | (2006.01) |
| *H02K 15/03* | (2006.01) |
| *H02K 1/27* | (2006.01) |
| *F27B 5/04* | (2006.01) |
| *F27D 15/00* | (2006.01) |
| *F27B 17/00* | (2006.01) |
| *F27B 9/12* | (2006.01) |
| *F27B 9/39* | (2006.01) |
| *F27B 9/38* | (2006.01) |
| *B22F 3/24* | (2006.01) |
| *C22C 38/00* | (2006.01) |
| *H01F 1/053* | (2006.01) |
| *H02K 21/00* | (2006.01) |
| *H01F 1/059* | (2006.01) |
| *C21D 1/00* | (2006.01) |
| *F27B 9/30* | (2006.01) |

(52) U.S. Cl.
CPC ............... *B22F 3/24* (2013.01); *C21D 1/26* (2013.01); *C22C 38/002* (2013.01); *C22C 38/005* (2013.01); *C22C 38/10* (2013.01); *C22C 38/14* (2013.01); *C22C 38/16* (2013.01); *F27B 5/04* (2013.01); *F27B 9/12* (2013.01); *F27B 9/38* (2013.01); *F27B 9/39* (2013.01); *F27B 17/0016* (2013.01); *F27D 3/0024* (2013.01); *F27D 15/00* (2013.01); *H01F 1/0536* (2013.01); *H01F 1/0557* (2013.01); *H02K 1/02* (2013.01); *H02K 1/276* (2013.01); *H02K 1/2766* (2013.01); *H02K 15/03* (2013.01); *H02K 21/00* (2013.01); *B22F 2003/248* (2013.01); *B22F 2301/355* (2013.01); *B22F 2998/10* (2013.01); *B22F 2999/00* (2013.01); *C21D 1/00* (2013.01); *F27B 2009/3066* (2013.01); *H01F 1/0596* (2013.01)

(56) References Cited

U.S. PATENT DOCUMENTS

| | | | |
|---|---|---|---|
| 2007/0241333 A1 | 10/2007 | Park et al. | |
| 2008/0131684 A1* | 6/2008 | Adler | B22F 5/006 |
| | | | 428/312.8 |
| 2012/0280775 A1 | 11/2012 | Nagata et al. | |
| 2013/0052599 A1 | 2/2013 | Toyozawa | |
| 2013/0076184 A1* | 3/2013 | Horiuchi | B22F 3/02 |
| | | | 310/152 |
| 2013/0241333 A1 | 9/2013 | Horiuchi et al. | |
| 2014/0139064 A1 | 5/2014 | Horiuchi et al. | |
| 2014/0290803 A1* | 10/2014 | Kato | H01F 1/0577 |
| | | | 148/302 |
| 2015/0143952 A1 | 5/2015 | Horiuchi et al. | |
| 2015/0147228 A1 | 5/2015 | Endo et al. | |

FOREIGN PATENT DOCUMENTS

| | | | |
|---|---|---|---|
| EP | 2733711 | 5/2014 | |
| JP | 62-137117 | 6/1987 | |
| JP | 62137117 A * | 6/1987 | .......... B21B 45/008 |
| JP | 7-109512 | 4/1995 | |
| JP | 07109512 A * | 4/1995 | |
| JP | 10-92617 | 4/1998 | |
| JP | 2003-124134 | 4/2003 | |
| JP | 2007-12912 | 1/2007 | |
| JP | 2009-236367 | 10/2009 | |
| JP | 2011-114236 | 6/2011 | |
| JP | 2014-103281 | 6/2014 | |
| WO | 2011/121647 A1 | 10/2011 | |
| WO | 2013/108830 | 7/2013 | |
| WO | 2014/156031 A1 | 10/2014 | |
| WO | 2014/156047 A1 | 10/2014 | |

OTHER PUBLICATIONS

Written Opinion for International Patent Application No. PCT/JP2015/001640 dated Jun. 9, 2015, 3 pages.
Indian Office Action for Indian Patent Application No. 201717002848 dated Apr. 22, 2019.
Extended European Search Report for European Patent Application No. 15886180.7 dated Jul. 16, 2018.

* cited by examiner

PERMANENT MAGNET, MOTOR, AND GENERATOR

CROSS-REFERENCE TO RELATED APPLICATIONS

This application is a continuation of prior International Application No. PCT/JP2015/001640 filed on Mar. 23, 2015; the entire contents of all of which are incorporated herein by reference.

FIELD

Embodiments described herein generally relate to a permanent magnet, a motor, and a generator.

BACKGROUND

Known examples of a high-performance rare earth magnet include a Sm—Co-based magnet, a Nd—Fe—B-based magnet, and the like. Fe and Co in the magnets contribute to an increase in saturation magnetization. These magnets contain rare earth elements such as Nd and Sm, which bring about large magnetic anisotropy derived from the behavior of 4f electron in the rare earth elements in a crystal field. This creates high coercive force, thereby realizing the high-performance magnet.

The high-performance magnet is mainly used for electrical devices such as a motor, a speaker, and a measuring instrument. In recent years, requests for downsizing, weight reduction, and low power consumption of various electrical devices have been increased. In response to the requests, there is a demand for a permanent magnet with higher performance that has an improved maximum magnetic energy product (BHmax) of the permanent magnet. In recent years, a variable magnetic flux motor has been proposed, and contributes to an improvement in efficiency of a motor.

The Sm—Co-based magnet is high in Curie temperature and can achieve good motor property at high temperature. However, the Sm—Co-based magnet is desired to have a higher coercive force, higher magnetization, and an improved squareness ratio. It is considered that increasing the concentration of Fe is effective for higher magnetization of the Sm—Co-based magnet. However, with the conventional manufacturing method, increasing the concentration of Fe tends to deteriorate the squareness ratio. Thus, the realization of a high-performance magnet for motor requires a technique that achieves expression of high coercive force while improving the magnetization with a high Fe concentration composition.

DETAILED DESCRIPTION

Figure 1:
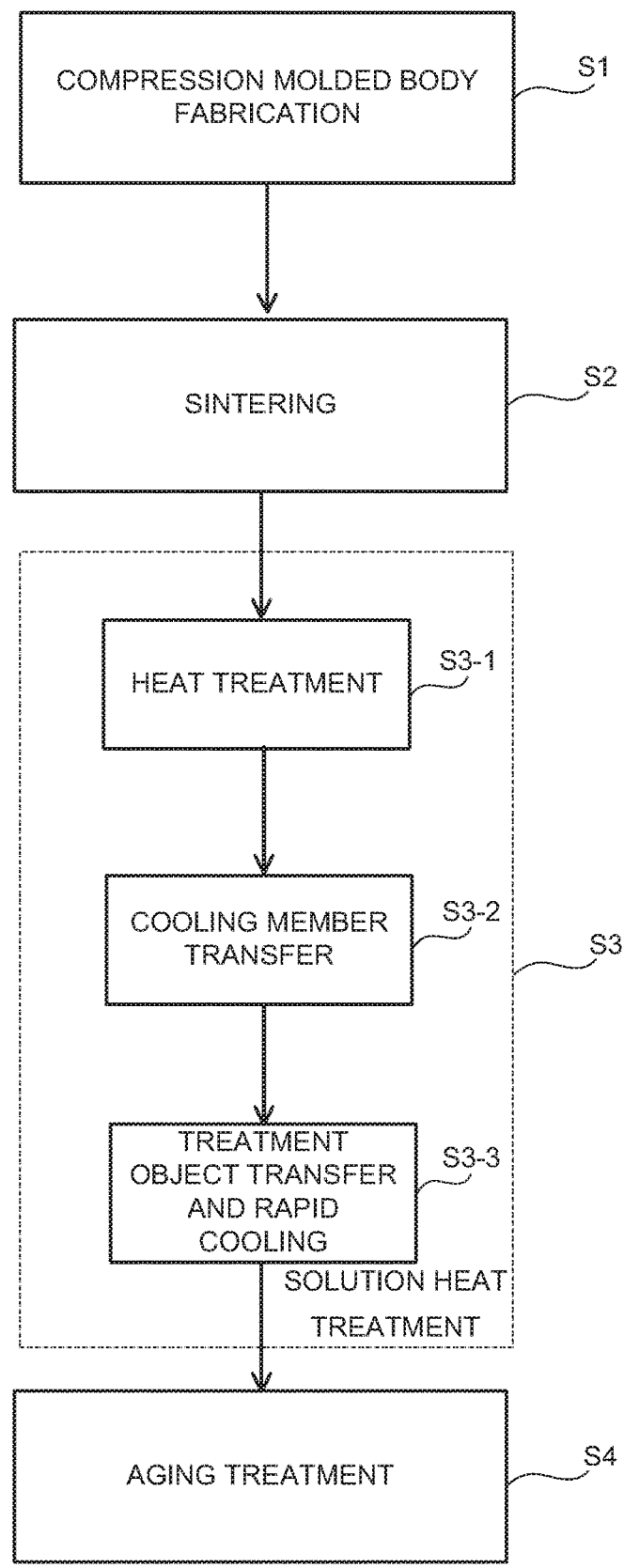
FIG. 1 is a flowchart illustrating an example of a permanent magnet manufacturing method.

A method of manufacturing a permanent magnet comprises: press-forming alloy powder in a magnetic field to fabricate a compression molded body; sintering the compression molded body to fabricate a sintered body; performing a solution heat treatment on the sintered body; and performing a aging heat treatment on sintered body after the solution heat treatment. The solution heat treatment includes: performing a heat treatment on a treatment object having the sintered body at a temperature $T_{ST}$ of 1100 to 1200° C. inside a heating chamber having a heater; transferring a cooling member into the heating chamber after the heat treatment and placing the cooling member between the heater and the treatment object, the cooling member including a first layer and a second layer on the first layer, the first layer having a first thermal emissivity, the second layer having a second thermal emissivity lower than the first thermal emissivity, and the first layer being faced with the treatment object; and transferring the treatment object together with the cooling member to the outside of the heating chamber, and cooling the treatment object until a temperature of the treatment object becomes a temperature lower than a temperature $T_{ST}$–200° C. In cooling the treatment object, a cooling rate until the temperature of the treatment object becomes the temperature $T_{ST}$–200° C. is 5° C./s or more.

Hereinafter, embodiments will be described with reference to the accompanying drawings. The drawings are schematically illustrated, in which, for example, the relation between a thickness and plane dimensions, and a ratio between thicknesses of layers may differ from actual ones. In the embodiments, same reference numerals are given to substantially the same components to omit redundant description.

First Embodiment

A permanent magnet and its manufacturing method of this embodiment will be described below.

FIG. 1 is a flowchart illustrating an example of the permanent magnet manufacturing method of this embodiment. As illustrated in FIG. 1, the example of the permanent magnet manufacturing method of this embodiment includes a compression molded body fabrication step (S1), a sintering step (S2), a solution heat treatment step (S3), and an aging treatment step (S4).

An example of the permanent magnet manufacturable by the above manufacturing method example will be described. The permanent magnet includes, for example, a sintered body including a composition expressed by a composition formula: $R_pFe_qM_rCu_tCo_{100-p-q-r-t}$ (in the formula, R is at least one element selected from rare earth elements, M is at least one element selected from a group consisting of Zr, Ti, and Hf, p is a number satisfying 10.5≤p≤12.5 atomic percent, q is a number satisfying 27≤q≤40 atomic percent, r is a number satisfying 0.88≤r≤4.5 atomic percent, and t is a number satisfying 4.5≤t≤10.7 atomic percent).

The R in the composition formula is an element that can provide large magnetic anisotropy to a magnetic material. As the R element, one element or a plurality of elements selected from rare earth elements including, for example, yttrium (Y) can be used, and, for example, samarium (Sm), cerium (Ce), neodymium (Nd), praseodymium (Pr), or the like can be used. Especially, the use of Sm is preferable. For example, in the case where a plurality of elements including Sm are used as the R element, the Sm concentration is set to 50 atomic percent or more with respect to all the elements usable as the R element, thereby enabling enhancement of performance of the magnet material, for example, a coercive force. Sm is included preferably by 70 atomic percent or more with respect to the elements usable as the R element, and more preferably by 90 atomic percent or more.

Setting the concentration of the element usable as the R element, for example, to not less than 10.5 atomic percent nor more than 12.5 atomic percent can increase the coercive force. When the concentration of the element usable as the R element is less than 10.5 atomic percent, a large amount of α-Fe precipitates, resulting in decreased coercive force. When the concentration of the element usable as the R element is more than 12.5 atomic percent, the saturation magnetization deteriorates. The concentration of the element usable as the R element is preferably not less than 10.9 atomic percent nor more than 12.1 atomic percent, and more preferably not less than 11.0 atomic percent nor more than 12.0 atomic percent.

The M in the composition formula is an element that can express high coercive force in the composition with high Fe concentration. As the M element, for example, one element or a plurality of elements selected from a group consisting of titanium (Ti), zirconium (Zr), and hafnium (Hf) are used. When the content r of the M element is more than 4.5 atomic percent, a hetero-phase excessively containing the M element is more likely to be generated, and both the coercive force and the magnetization are more likely to deteriorate. When the content r of the M element is less than 0.88 atomic percent, an effect of increasing the Fe concentration tends to decrease. In short, the content r of the M element is preferably not less than 0.88 atomic percent nor more than 4.5 atomic percent. The content r of the M element is more preferably not less than 1.14 atomic percent nor more than 3.58 atomic percent, furthermore preferably not less than 1.49 atomic percent nor more than 2.24 atomic percent, and moreover preferably not less than 1.55 atomic percent nor more than 2.23 atomic percent.

Fe is an element that mainly performs magnetization of the magnet material. When a large amount of Fe is compounded, it is possible to enhance the saturation magnetization of the magnet material. However, when Fe is excessively compounded, it becomes difficult to obtain a desired crystal phase because of precipitation of α-Fe and phase separation, possibly decreasing the coercive force. A content q of Fe is therefore preferably not less than 27 atomic percent nor more than 40 atomic percent. The content q of Fe is more preferably not less than 28 atomic percent nor more than 36 atomic percent, and furthermore preferably not less than 30 atomic percent nor more than 33 atomic percent.

The M element preferably contains at least Zr. In particular, using Zr by 50 atomic percent or more of the M element enhances the coercive force of the permanent magnet. On the other hand, Hf is especially expensive in the M element, and therefore the usage of Hf, if used, is preferably small. For example, the content of Hf is preferably less than 20 atomic percent of the M element.

Cu is an element that can express high coercive force in the magnet material. The content of Cu is preferably, for example, not less than 4.5 atomic percent nor more than 13.5 atomic percent. When Cu is compounded by an amount larger than the range, the magnetization significantly deteriorates. When Cu is compounded by an amount smaller than the range, it becomes difficult to obtain high coercive force and a good squareness ratio. A content t of Cu is more preferably not less than 4.9 atomic percent nor more than 9.0 atomic percent, and furthermore preferably not less than 5.3 atomic percent nor more than 5.8 atomic percent.

Co is an element that performs magnetization of the magnet material and can express high coercive force. When a large amount Co is compounded, a high Curie temperature can be obtained to enhance thermal stability of the magnetic property. When the amount of Co compounded is small, these effects decrease. However, when Co is excessively added, the proportion of Fe relatively reduces, possibly resulting in deterioration of magnetization. Replacing 20 atomic percent or less of Co with one element or a plurality of elements selected from a group consisting of Ni, V, Cr, Mn, Al, Si, Ga, Nb, Ta, and W enhances the magnetic property, for example, the coercive force.

The permanent magnet having the above composition has a two-dimensional metallic structure including a main phase having a hexagonal $Th_2Zn_{17}$ crystal phase (2-17 crystal phase) and a grain boundary phase arranged between crystal grains constituting the main phase. The main phase further has a cell phase having a 2-17 crystal phase, and a Cu rich phase having a hexagonal $CaCu_5$ crystal phase (1-5 crystal phase). Preferably, the Cu rich phase is formed to surround the cell phase. The above structure is also referred to as a cell structure. The Cu rich phase also includes a cell wall phase that separates the cell phase. Preferably, the c-axis of the $Th_2Zn_{17}$ crystal phase extends in parallel to the easy magnetization axis. It should be noted that "parallel" may include a state of falling within ±10 degrees from the parallel direction (approximately parallel). The metallic structure may further include a hexagonal $TbCu_7$ crystal phase (1-7 crystal phase). The $TbCu_7$ crystal phase is a crystal phase serving as a precursor of the phase separation structure of the $Th_2Zn_{17}$ crystal phase and the $CaCu_5$ crystal phase.

The Cu concentration in the Cu rich phase is higher than the Cu concentration in the $Th_2Zn_{17}$ crystal phase. For example, the Cu concentration in the Cu rich phase is preferably equal to or more than 1.2 times the Cu concentration in the $Th_2Zn_{17}$ crystal phase. The Cu rich phase is present, for example, in a linear shape or a plate shape at a cross section including the c-axis of the $Th_2Zn_{17}$ crystal phase. Examples of the structure of the Cu rich phase are not specifically limited but include the hexagonal $CaCu_5$ crystal phase (1-5 crystal phase) and the like. The permanent magnet may have a plurality of Cu rich phases different in phase.

The magnetic domain wall energy of the Cu rich phase is higher than the magnetic domain wall energy of the $Th_2Zn_{17}$ crystal phase. This difference in the magnetic domain wall energy constitutes a barrier to movement of the magnetic domain wall. Specifically, the Cu rich phase serves as a pinning site, making it possible to restrict the movement of the magnetic domain wall between a plurality of cell phases. In particular, forming the cell structure enhances the effect of restricting the movement of the magnetic domain wall. This is also referred to as a magnetic domain wall pinning effect. Thus, more preferably, the Cu rich phase is formed to surround the cell phase.

In a Sm—Co-based magnet containing 27 atomic percent or more of Fe, the Cu concentration in the Cu rich phase is preferably not less than 10 atomic percent nor more than 60 atomic percent. Increasing the Cu concentration in the Cu rich phase can increase the coercive force and the squareness ratio. In the area where the Fe concentration is high, the Cu concentration in the Cu rich phase is likely to vary, causing, for example, a Cu rich phase having a high magnetic domain wall pinning effect and a Cu rich phase having a low magnetic domain wall pinning effect. This deteriorates the coercive force and the squareness ratio.

If the magnetic domain wall shifting from the pinning site moves, the magnetization is inverted correspondingly to the movement, resulting in deteriorated magnetization. If all the magnetic domain walls shift from the pinning site in a certain magnetic field upon application of an external magnetic field, the magnetization becomes less likely to deteriorate due to application of a magnetic field, resulting in a good squareness ratio. In other words, it is considered that if the magnetic domain wall shifts from the pinning site and moves in a magnetic field that is weaker than the coercive force upon application of a magnetic field, the magnetization decreases correspondingly to the movement, leading to deterioration of the squareness ratio.

As described above, the permanent magnet manufactured by the permanent magnet manufacturing method of this embodiment has a phase separation structure having at least two phases such as the $Th_2Zn_{17}$ crystal phase and the $CaCu_5$ crystal phase. Forming the above phase separation structure over the entire permanent magnet can realize the magnetic property such as a high coercive force.

Next, the details of the example of the permanent magnet manufacturing method illustrated in FIG. 1 will be described. In the compression molded body fabrication step (S1), first, an alloy powder is prepared which contains predetermined elements necessary to compose the permanent magnet. For example, the alloy powder is prepared so that the permanent magnet obtained by the permanent magnet manufacturing method of this embodiment has the composition expressed by the above composition formula. Then, the alloy powder is put in a metallic mold disposed in an electromagnet, and press-formed while a magnetic field is being applied thereon to manufacture a compression molded body having an oriented crystallographic axis.

For example, an alloy ingot obtained by casting a molten metal prepared by an arc melting method or a high frequency melting method can be pulverized to prepare an alloy powder. The alloy powder may be prepared to have a desired composition by mixing a plurality of powders different in composition. Further, the alloy powder may be prepared using a mechanical alloying method, a mechanical grinding method, a gas atomizing method, a reduction diffusion method or the like. In fabrication of an alloy thin strip using the strip cast method, a flake-shaped alloy thin strip is fabricated, and the alloy thin strip is then pulverized to prepare the alloy powder. For example, an alloy molten metal can be poured by tilting to a chill roll that rotates at a peripheral velocity of not less than 0.1 m/sec nor more than 20 m/sec to fabricate a thin strip in which the molten alloy is consecutively coagulated to a thickness of 1 mm or less. The peripheral velocity of less than 0.1 m/sec is likely to cause variation in composition in the thin strip. The peripheral velocity of more than 20 m/sec possibly deteriorates the magnetic property such as the crystal grains becoming too fine. The peripheral velocity of the chill roll is not less than 0.3 m/sec nor more than 15 m/sec, and more preferably not less than 0.5 m/sec nor more than 12 m/sec.

Furthermore, a heat treatment performed on the alloy powder or an alloy material before pulverization can homogenize the material. For example, a jet mill or a ball mill may be used to pulverize the material. Note that pulverizing the material in an inert gas atmosphere or an organic solvent can prevent oxidation of the powder.

When the average grain diameter of the powder after pulverization is not less than 2 μm nor more than 5 μm, and the proportion of the powder with the grain diameter of not less than 2 μm nor more than 10 μm is 80% or more of the whole powder, the degree of orientation becomes high and the coercive force becomes large. To realize the them, pulverization with the jet mill is preferable.

For example, in the case of pulverizing with the ball mill, even if the average grain diameter of the powder is not less than 2 μm nor more than 5 μm, a large amount of fine powder with a grain diameter at a submicron level is contained. Aggregation of the fine powder makes the c-axis of the crystal in the $TbCu_7$ phase becomes less likely to align in the direction of easy magnetization axis in magnetic field orientation during pressing, resulting in deterioration of the degree of orientation. The fine powder possibly increases the amount of oxide in the sintered body to deteriorate the coercive force. In particular, when the Fe concentration is 27 atomic percent or more, the proportion of the powder after pulverization having a grain diameter of 10 μm or more is desirably 10% or less of the whole powder. When the Fe concentration is 27 atomic percent or more, the amount of hetero-phase in the ingot being a raw material increases. In this hetero-phase, not only the amount of powder increases but also the grain diameter tends to increase such that the grain diameter may become 20 μm or more.

When such an ingot is pulverized, for example, the powder with a grain diameter of 15 μm or more may become the powder in the hetero-phase as it is. If the pulverized powder containing such coarse powder in the hetero-phase is pressed in a magnetic field to form a sintered body, the hetero-phase remains, causing deterioration of the coercive force, deterioration of the magnetization, deterioration of the squareness or the like. The deterioration of the squareness makes the magnetization difficult. In particular, magnetization after assembling to a rotor or the like becomes difficult. Thus, setting the powder with a grain diameter of 10 μm or more to 10% or less of the whole powder increases the coercive force while suppressing the deterioration of the squareness ratio in a high Fe concentration composition containing 27 atomic percent or more of Fe.

The sintering step (S2) includes a temporary sintering step, for example, in a vacuum atmosphere and a main sintering step in an inert gas atmosphere of an Ar gas or the like. In the main sintering step, a heat treatment is performed by holding the above-described compression molded body at a temperature of not lower than 1170° C. nor higher than 1215° C. for not less than 0.5 hours nor more than 15 hours.

When the holding temperature is, for example, lower than 1170° C., the sintered body to be produced is likely to decrease in density. Further, with a higher Fe concentration, the melting point is more likely to decrease. When the holding temperature is higher than 1215° C., the magnetic property may deteriorate due to excessive evaporation of the R element such as Sm in the powder. The holding temperature is more preferably not lower than 1180° C. nor higher than 1205° C., and furthermore preferably not lower than 1190° C. nor higher than 1195° C.

When the holding time is less than 0.5 hours, the density is likely to be non-uniform, and the magnetization is likely to deteriorate. Further, the crystal grain diameter of the sintered body decreases and the grain boundary phase ratio becomes high, thereby making the magnetization likely to deteriorate. When the heat treatment time is more than 15 hours, the evaporation of the R element in the powder becomes excessive, and the magnetic property possibly deteriorates. The holding time is more preferably not less than 1 hour nor more than 10 hours, and furthermore preferably not less than 1 hour nor more than 4 hours.

In the temporary sintering step, a heat treatment is performed by holding the above-described compression molded body at a temperature, which is not lower than a temperature lower by 50° C. or more than the holding temperature in the main sintering step nor higher than the holding temperature in the main sintering step, for not less than 30 minutes nor more than 60 minutes. As described above, the vacuum is maintained until the temperature becomes near the holding temperature in the main sintering step, and then switched to an inert gas atmosphere and held, thereby improving the density of the sintered body. A temperature lower by more than 50° C. than the holding temperature in the main sintering step may fail to sufficiently increase the density of the sintered body.

In the temporary sintering step, it is preferable to make a vacuum atmosphere having a degree of vacuum of $9 \times 10^{-2}$ Pa or less. When the degree of vacuum is more than $9 \times 10^{-2}$ Pa, an oxide of the R element such as Sm is excessively formed, possibly deteriorating the magnetic property. The degree of vacuum in the temporary sintering step is preferably $5 \times 10^{-2}$ Pa or less, and more preferably $1 \times 10^{-2}$ Pa or less.

The solution heat treatment step (S3) is a treatment that forms the $TbCu_7$ crystal phase which serves as a precursor of the phase separation structure. The aging treatment step (S4) is a treatment that controls the metallic structure to enhance the coercive force of the magnet, and is a treatment that forms the metallic structure of the magnet to have a phase separation structure including at least the $Th_2Zn_{17}$ crystal phase and the $CaCu_5$ crystal phase.

Preferably, the solution heat treatment step (S3) is performed to form a homogeneous $TbCu_7$ crystal phase in the whole sintered body. This is because by performing the aging treatment step (S4) using the $TbCu_7$ crystal phase as a parent phase, the metallic structure is separated into a plurality of phases including the $Th_2Zn_{17}$ crystal phase and the $CaCu_5$ crystal phase to form a cell structure. However, when the Fe concentration is increased to 27 atomic percent or more, it becomes difficult to obtain the homogeneous $TbCu_7$ crystal phase in the solution heat treatment step (S3). As described above, unless the cell structure is sufficiently formed, the magnetic property such as the coercive force is more likely to deteriorate.

In the sintered body being the Sm—Co-based permanent magnet having a Fe concentration of 27 atomic percent or more, it is important to perform a so-called rapid cooling of cooling the sintered body at a high cooling rate after the heat treatment in the solution heat treatment in order to obtain a more homogeneous $TbCu_7$ crystal phase by the solution heat treatment.

The cooling rate of the heated sintered body changes depending on, for example, the cooling capacity of a cooling mechanism and the total weight of the sintered body. For example, for a sintered body having a weight of a laboratory level, namely, about several tens of grams, the high cooling rate can be sometimes realized using a heat treatment furnace including the conventional cooling mechanism. However, in the case of performing rapid cooling on a plurality of sintered bodies having a weight of several hundreds of grams to several kilograms manufacturable in a mass production facility, the conventional heat treatment furnace cannot provide a sufficient cooling rate because of insufficient cooling capacity due to a high total heat capacity of the sintered bodies. Accordingly, for mass production of magnets having high magnetic property such as high coercive force, it is required to cool a large amount of sintered body at a sufficient cooling rate in the solution heat treatment.

Hence, in the permanent magnet manufacturing method according to the present invention, a cooling member having a multilayer structure is used to perform the cooling in the solution heat treatment. This can perform the cooling at a sufficient cooling rate even in the case of performing the solution heat treatment on a large amount of sintered body.

Figure 2:
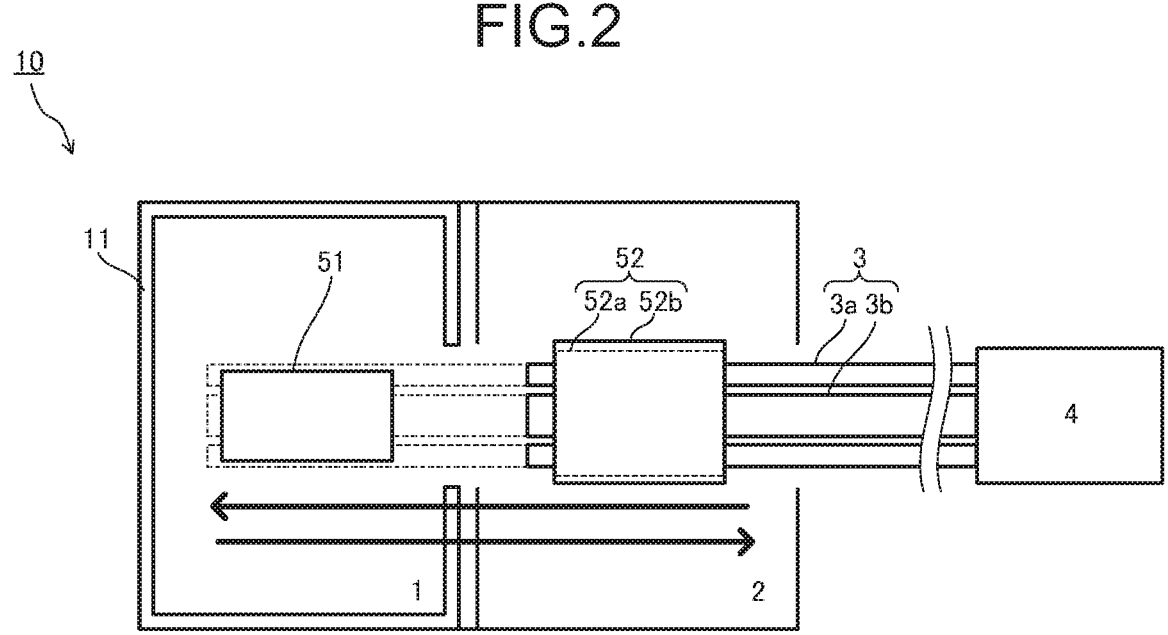
FIG. 2 is a schematic view illustrating a configuration example of a permanent magnet manufacturing apparatus.

An example of the solution heat treatment in the case of using the cooling member having a multilayer structure will be further described. First, a configuration example of a permanent magnet manufacturing apparatus applicable to the permanent magnet manufacturing method of this embodiment will be described referring to FIG. 2. A permanent magnet manufacturing apparatus 10 illustrated in FIG. 2 includes at least a heating chamber 1 having a heater 11 such as a carbon heater on a side wall side or the like, a cooling chamber 2 adjacent to the heating chamber 1, a transfer mechanism 3 that transfers a treatment object 51 and a cooling member 52 between the inside and the outside of the heating chamber 1, and a control mechanism 4 that controls the transfer operation of the transfer mechanism 3. The cooling chamber 2 does not always have to be provided. Further, a manufacturing apparatus used for the solution heat treatment step (S3) may be used also in the sintering step (S2) and the aging treatment step (S4).

The treatment object 51 has one or more sintered bodies of alloy powder press-formed in a magnetic field. The treatment object 51 has, for example, a plurality of sintered bodies and a heat-resistant tray housing the plurality of sintered bodies. The thickness of the treatment object 51 is, for example, 4 mm or more.

The cooling member 52 has a first layer 52a and a second layer 52b stacked on the first layer 52a. A structure example of the cooling member 52 will be further described referring to FIG. 3.

The first layer 52a has a function of absorbing heat emitted from the treatment object 51. The first layer 52a has a first thermal emissivity. The first thermal emissivity is preferably, for example, 0.5 or more. As the first layer 52a, for example, carbon, a metal carbide, a metal oxide, a refractory brick or the like can be used. Further, to obtain a heat capacity necessary for the rapid cooling, the thickness of the first layer 52a is preferably set to, for example, 30 mm or more.

The second layer 52b has a function of reflecting heat emitted from the heater 11. The second layer 52b has a second thermal emissivity lower than that of the first layer 52a. The second thermal emissivity is preferably, for example, less than 0.5. As the second layer 52b, for example, stainless steel, copper, molybdenum, tungsten, titanium or the like can be used. The second layer 52b is separate from the first layer 52a in FIG. 3 but, not limited to this, may be in contact with the first layer 52a.

Figure 3:
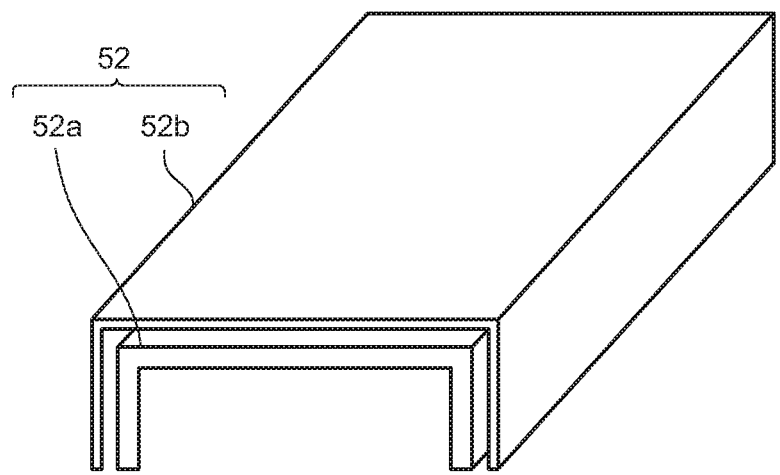
FIG. 3 is a schematic view illustrating a structure example of a cooling member.

The cooling member 52 illustrated in FIG. 3 has a bridge shape. The cooling member 52 is not limited to this, but only needs to have, for example, such a shape that the geometrical factor of thermal emission between the treatment object 51 and the first layer 52a is 0.5 or more when the cooling member 52 is arranged between the heater 11 and the treatment object 51. For example, the geometrical factor of thermal emission can be made smaller by decreasing the distance between the treatment object 51 and the first layer 52a, increasing the area of the face of the first layer 52a located on the treatment object 51 side, or bringing the shape of the face of the first layer 52a located on the treatment object 51 side into a curved shape protruding upward or the like.

Figure 4:
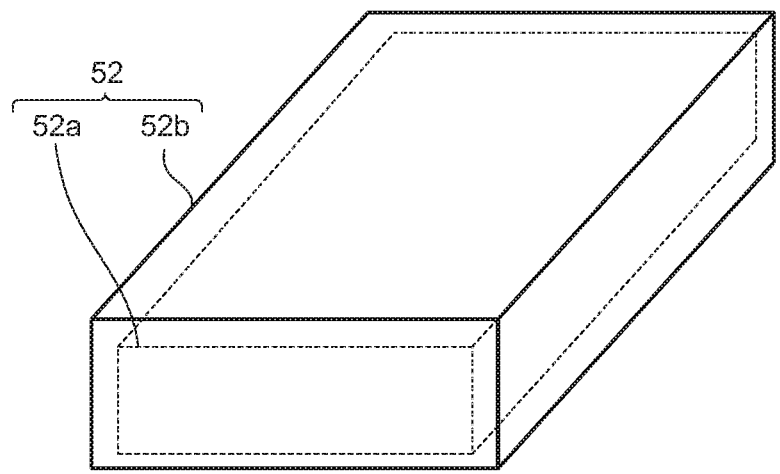
FIG. 4 is a schematic view illustrating another structure example of the cooling member.

FIG. 4 is a view illustrating another structure example of the cooling member 52. The cooling member 52 illustrated in FIG. 4 has a cup-shape structure in which the first layer 52a and the second layer 52b can surround the upper face and the side face of the treatment object 51.

Figure 5:
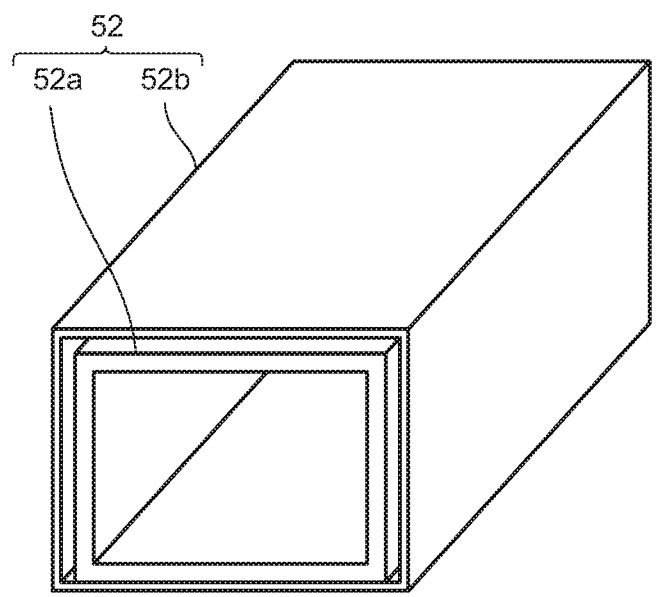
FIG. 5 is a schematic view illustrating another structure example of the cooling member.

FIG. 5 is a view illustrating another structure example of the cooling member 52. The cooling member 52 illustrated in FIG. 5 has a cylindrical structure capable of surrounding the upper face, the lower face and a pair of side faces of the treatment object.

By using the cooling members 52 illustrated in FIG. 4 and FIG. 5, the overlapping area between the treatment object 51 and the cooling member 52 can be increased to further enhance the cooling capacity by the cooling member 52. The above is the description of the example of the cooling member 52.

The transfer mechanism 3 has a transfer mechanism 3a that transfers the treatment object 51, and a transfer mechanism 3b that transfers the cooling member 52. Note that one transfer mechanism may transfer the treatment object 51 and the cooling member 52.

The control mechanism 4 controls, for example, execution of an operation of transferring the treatment object 51 into the heating chamber 1 by the transfer mechanism 3, an operation of transferring the cooling member 52 into the heating chamber 1 by the transfer mechanism 3, and an operation of transferring the treatment object 51 located in the heating chamber 1 together with the cooling member 52 to the outside of the heating chamber 1 by the transfer mechanism 3. For the control mechanism 4, for example, hardware using a processor or the like is used. Note that the operations may be executed by saving each operation as an operation program in a computer-readable recording medium such as a memory and appropriately reading out the operation program stored in the recording medium by the hardware.

Next, an example of the solution heat treatment step (S3) for the permanent magnet using the manufacturing apparatus 10 illustrated in FIG. 3 will be described.

Figure 6:
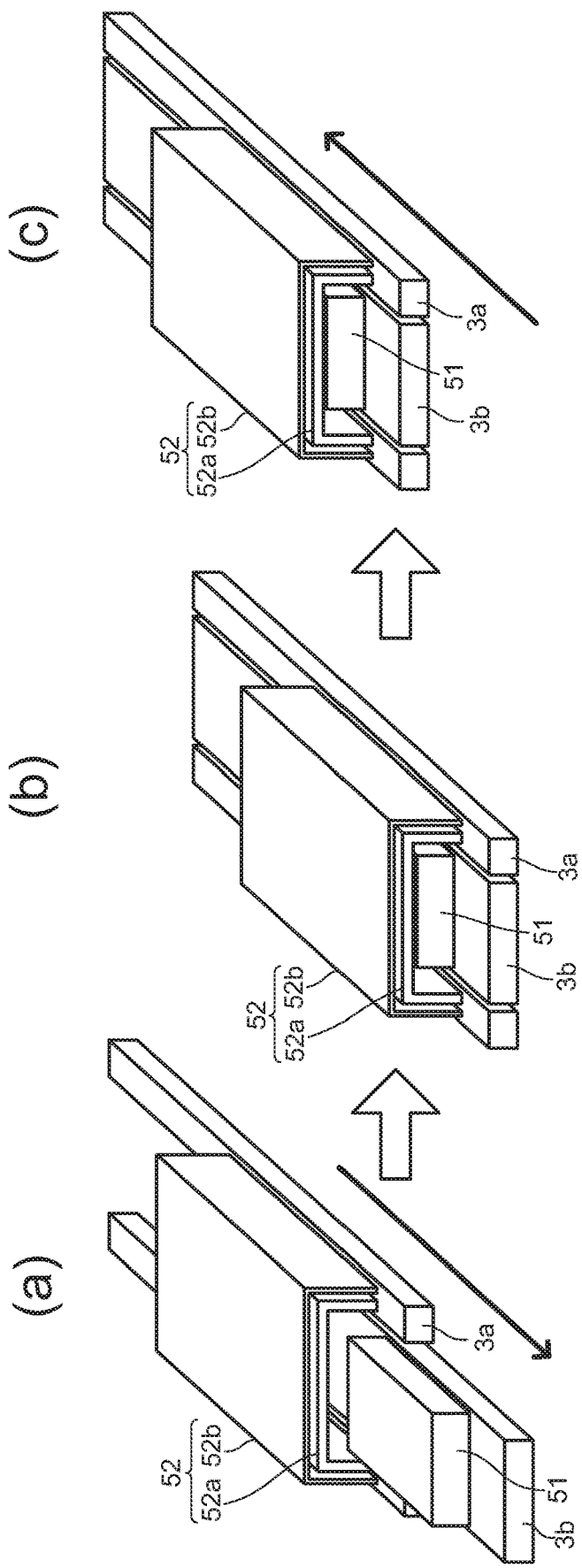
FIG. 6 is a schematic view for explaining an example of a solution heat treatment step.

The solution heat treatment step (S3) includes, as illustrated in FIG. 1, a heat treatment step (S3-1), a cooling member transfer step (S3-2), and a treatment object transfer and rapid cooling step (S3-3). The steps will be further described referring to FIG. 6. FIG. 6 is a schematic view for explaining the solution heat treatment step (S3).

In the heat treatment step (S3-1), a heat treatment is performed in the heating chamber 1 for the treatment object 51 at a temperature $T_{ST}$ lower than the heat treatment temperature during the main sintering step in the sintering step (S2). In the case of using the manufacturing apparatus 10 illustrated in FIG. 3 only for the solution heat treatment step (S3), the transfer mechanism 3b transfers the treatment object 51 into the heating chamber 1. In the heat treatment step (S3-1), the heat treatment is performed by holding the treatment object 51, for example, at a temperature of not lower than 1100° C. nor higher than 1200° C. for not less than 0.5 hours nor more than 40 hours.

When the holding temperature in the heat treatment step (S3-1) is lower than 1100° C. and if it is higher than 1200° C., the proportion of the $TbCu_7$ crystal phase existing in the specimen after the solution heat treatment is small, possibly deteriorating the magnetic property such as the coercive force. The holding temperature is preferably not lower than 1110° C. nor higher than 1190° C., and more preferably not lower than 1120° C. nor higher than 1180° C.

When the holding time in the solution heat treatment is less than 0.5 hours, the constituent phase is likely to become non-uniform to make the coercive force more likely to decrease. Further, the crystal grain diameter of the metallic structure is likely to decrease to increase the grain boundary phase ratio, thereby making the magnetization likely to deteriorate. When the holding temperature in the solution heat treatment is more than 40 hours, the magnetic property may deteriorate due to the evaporation of the R element in the sintered body or the like. The holding time is preferably not less than 1 hour nor more than 12 hours, and more preferably not less than 10 hours nor more than 18 hours. By performing the solution heat treatment in a vacuum or an inert atmosphere such as an argon gas, oxidization of the powder can be suppressed.

In this event, the cooling member 52 is preferably disposed at a position away from the heating chamber 1, for example, in the cooling chamber 2. Further, the cooling member 52 is preferably at a temperature lower than the temperature $T_{ST}$ in the heat treatment step (S3-1), for example, room temperature such as 25° C. Note that to cool the cooling member 52, a cooling mechanism such as a heat exchanger or a cooling water pipe may be used to cool the cooling member 52 in advance.

In the cooling member transfer step (S3-2), the transfer mechanism 3a transfers the cooling member 52 into the heating chamber 1 as illustrated in FIG. 6(a), and places the cooling member 52 between the heater 11 and the treatment object 51 so that the first layer 52a is located on the treatment object 51 side as illustrated in FIG. 6(b). In other words, the cooling member 52 is made to overlap with at least a part of the treatment object 51. Note that the heating by the heater 11 is stopped after the heat treatment step (S3-1) and before the cooling member transfer step (S3-2).

In the treatment object transfer and rapid cooling step (S3-3), as illustrated in FIG. 6(c), the treatment object 51 is cooled until the temperature of the treatment object 51 reaches a temperature lower than $T_{ST}$–200° C. (for example, room temperature such as 25° C.) while the transfer mechanism 3a and the transfer mechanism 3b are transferring the treatment object 51 together with the cooling member 52 to the outside of the heating chamber 1. The cooling rate until the temperature of the treatment object 51 reaches $T_{ST}$–200° C. is 5° C./s or more. Note that the above cooling rate is preferably 7° C./s or more, 10° C./s or more, and more preferably 12° C./s or more. Besides, the upper limit value of the cooling rate is not particularly limited, but may be 20° C./s or less. The cooling member 52 transferred to the outside of the heating chamber 1 is cooled again to room temperature such as 25° C.

Note that the cooling rate here is calculated by dividing the difference between the initial temperature and the final temperature of the treatment object 51 by the time taken for the temperature change. In other words, the cooling at the cooling rate of 5° C./s from the temperature $T_{ST}$ to $T_{ST}$–200° C. corresponds to that cooling started at the temperature $T_{ST}$ reaches $T_{ST}$–200° C. within 20 seconds. The temperature of the treatment object 51 is measured, for example, by a thermocouple or the like bonded to the treatment object 51 with a heat resistant adhesive or the like.

As described above, in the permanent magnet manufacturing method of this embodiment, while the first layer 52a of the cooling member 52 is absorbing the heat emitted from the treatment object 51, the second layer 52b reflects the heat emitted from the heater 11. In the case of the conventional configuration without using the cooling member 52, the treatment object 51 is slowly cooled when transferred from the inside to the outside of the heating chamber 1, leading to a decreased cooling rate. In contrast to this, use of the cooling member 52 makes it possible to bring the cooling rate until the temperature of the treatment object 51 reaches $T_{ST}-200°$ C. to 5° C./s or more, for example, in a sintered body of a compression molded body having a total weight of not less than 200 g nor more than 2000 g. The above is the description of the solution heat treatment.

Note that a quality improvement treatment may be performed between the sintering step (S2) and the solution heat treatment step (S3). The quality improvement treatment is a treatment of controlling the metallic structure, especially, the macro structure.

In the quality improvement treatment, a heat treatment is performed by holding the sintered body at a temperature lower by 10° C. or more than the heat treatment temperature in the sintering and a temperature higher by 10° C. or more than the heat treatment temperature in the solution heat treatment for not less than 2 hour nor more than 12 hours. In the case of performing the heat treatment not at the temperature lower by 10° C. or more than the heat treatment temperature in the sintering, the hetero-phase derived from the liquid phase generated during the sintering cannot be sufficiently removed. The orientation of the hetero-phase is often low, and existence of the hetero-phase makes the crystal orientation of the crystal grains more likely to deviate from the easy magnetization axis, resulting in not only decreased squareness ratio but also deteriorated magnetization. Further, in the solution heat treatment, the temperature is low, leading to difficulty in sufficiently removing the hetero-phase generated during the sintering from the viewpoint of an element diffusion speed. Further, the grain growth speed is also low, possibly failing to obtain a sufficient crystal grain diameter and to expect the improvement in squareness ratio. In contrast to this, the quality improvement treatment performed at the temperature higher by 10° C. or more than the holding temperature in the solution heat treatment makes it possible to sufficiently remove the above-described hetero-phase and increase the crystal grains constituting the main phase.

The holding temperature in the quality improvement treatment is preferably, for example, not lower than 1130° C. nor higher than 1190° C. When the holding temperature is lower than 1130° C. and when it is higher than 1190° C., the squareness ratio may decrease. When the heat treatment time is less than 2 hours, diffusion is insufficient, the hetero-phase is not sufficiently removed, and the effect of improving the squareness ratio is small. When the heat treatment time is more than 12 hours, the R element such as Sm evaporates, possibly failing to obtain good magnetic property. The heat treatment time in the quality improvement treatment is more preferably not less than 4 hours nor more than 10 hours, and furthermore preferably not less than 6 hours nor more than 8 hours. The quality improvement treatment is preferably performed in a vacuum or an inert atmosphere such as argon gas in order to prevent oxidation.

In this event, setting the pressure in the chamber in the quality improvement treatment to a positive pressure enhances the effect of suppressing generation of the hetero-phase. The pressure in the chamber is preferably, for example, not less than 0.15 MPa nor more than 15 MPa, more preferably not less than 0.2 MPa nor more than 10 MPa, and furthermore preferably not less than 1.0 MPa nor more than 5.0 MPa.

The cooling when the solution heat treatment is performed after the quality improvement treatment is preferably slower than the rapid cooling after the solution heat treatment, namely, the cooling is preferably slow cooling. By performing the slow cooling, the variations in the metallic structure can be reduced to further improve the squareness ratio.

In the aging treatment step (S4), the sintered body is heated up to a temperature of not lower than 700° C. nor higher than 900° C., and then held at the reached temperature for not less than 0.5 hours nor more than 80 hours (first holding). Subsequently, the sintered body is subjected to the slow cooling at a cooling rate of not less than 0.2° C./min nor more than 2.0° C./min down to a temperature of not lower than 400° C. nor higher than 650° C., and then held at the reached temperature for not less than 0.5 hours nor more than 8 hours (second holding) for heat treatment. Then, the sintered body is cooled down to room temperature. Thus, the magnet of the sintered body can be obtained.

When the holding temperature is higher than 900° C. in the first holding, the cell phase becomes coarse, and the squareness ratio is likely to decrease. When the holding temperature is lower than 700° C., the cell structure is not obtained sufficiently, thereby making it difficult to express the coercive force. The holding temperature in the first holding is, for example, more preferably not lower than 780° C. nor higher than 840° C. When the holding time is less than 0.5 hours in the first holding, the cell structure becomes insufficient, thereby making it difficult to express the coercive force. When the holding time is longer than 80 hours, the cell wall phase becomes excessively thick, possibly deteriorating the squareness ratio. The holding time in the first holding is more preferably, for example, not less than 25 hours nor more than 40 hours.

When the cooling rate during the slow cooling is less than 0.2° C./min, the cell wall phase becomes excessively thick and the magnetization is likely to decrease. When the cooling rate is more than 2.0° C./min, a sufficient difference is not obtained in the Cu concentration between the cell phase and the cell wall phase, and the coercive force is likely to decrease. The cooling rate during the slow cooling is, for example, not less than 0.4° C./min nor more than 1.5° C./min, and more preferably not less than 0.5° C./min nor more than 1.3° C./min. When the slow cooling is performed down to lower than 350° C., the above-described low temperature hetero-phase is likely to be generated. When the slow cooling is performed down to a temperature higher than 650° C., the Cu concentration in the Cu rich phase does not sufficiently increase, possibly failing to obtain a sufficient coercive force. When the holding time in the second holding is more than 8 hours, the low-temperature hetero-phase is generated, possibly failing to obtain a sufficient magnetic property.

In the aging treatment, the sintered body may be held at a predetermined temperature for a fixed time during the slow cooling, and may be subjected to further slow cooling. The above-described aging treatment may be regarded as the main aging treatment, and a preliminary aging treatment may be performed, prior to the main aging treatment, by holding the sintered body at a temperature lower than the holding temperature in the first holding and for a time shorter than the holding time in the first holding. Holding during the slow cooling and the preliminary aging treatment can further increase the squareness ratio.

In the permanent magnet obtained by the above manufacturing method, it is preferable that 90 vol % or more of the metallic structure is the $Th_2Zn_{17}$ crystal phase and the CaCu$_5$ crystal phase. Note that in the case where the TbC$_{u7}$ crystal phase exists, 90 vol % or more of the metallic structure may be the Th$_2$Zn$_{17}$ crystal phase, the CaCu$_5$ crystal phase, and the TbC$_{u7}$ crystal phase.

When the cooling rate in the solution heat treatment step (S3) is low, the homogeneous TbC$_{u7}$ crystal phase cannot be obtained and a crystal grain composed of a coarse Th$_2$Zn$_{17}$ crystal phase may be formed. When the diameter of the crystal grain composed of the homogeneous TbC$_{u7}$ crystal phase is more than 300 nm, a magnetic domain structure can be formed inside the main phase, leading to decreased coercive force of the permanent magnet. To keep high coercive force of the permanent magnet, preferably, a region constituted by crystal grains composed of the Th$_2$Zn$_{17}$ crystal phase having a diameter of 300 nm or more of all crystal grains existing in the magnet is less than 5 vol %.

In the permanent magnet manufactured by the permanent magnet manufacturing method, the magnetic property such as the coercive force is high. For example, in the permanent magnet, a coercive force (iHc) of 1000 kA/m or more, 1200 kA/m or more, and 1500 kA/m or more can be expressed.

The composition of the permanent magnet is analyzed by, for example, an ICP (Inductively Coupled Plasma) emission spectrochemical analysis method, an SEM-EDX (SEM-Energy Dispersive X-ray Spectroscopy), a TEM-EDX (Transmission Electron Microscope-Energy Dispersive X-ray Spectroscopy) or the like. The volume ratios of the phases are comprehensively determined using the observations under an electron microscope and an optical microscope and the X-ray diffraction or the like in combination. The volume ratios can be obtained by an areal analysis method using an electron micrograph of a cross section of the permanent magnet. As the cross section of the permanent magnet, a cross section of a substantially center part of a surface having the largest surface area of the specimen is used.

The metallic structure such as the Th$_2$Zn$_{17}$ crystal phase, the Cu rich phase such as the CaCu$_5$ crystal phase, and the TbC$_{u7}$ crystal phase is identified, for example, in the following manner. First, a sample is observed by a scanning transmission electron microscope (STEM). In this event, the sample is observed under the SEM to find the place of the grain boundary phase, and the sample is processed using a focused ion beam (FIB) such that the grain boundary phase is present in the field of vision, making it possible to enhance the observation efficiency. The sample is the one undergone the aging treatment. In this event, the sample is preferably a non-magnetized article.

Subsequently, the concentrations of the elements in the cell phase, the Cu rich phase and the like are measured by using, for example, an energy dispersive X-ray spectroscopy (STEM-EDX) utilizing STEM.

When the concentrations of the elements are measured by the STEM-EDX, a specimen for measurement is cut out from the interior of the sample at a depth of 1 mm or more from the surface of the sample. The observation is carried out at an observation magnification of 100 k power to a plane parallel to the easy magnetization axis (c-axis).

For concentration measurement of the elements in each phase, a 3-dimension atom probe (3DAP) may be used. The analysis method using the 3DAP is an analysis method that applies a voltage to cause an electric field evaporation of an observed specimen, and detects ions generated by the electric field evaporation with a two-dimensional detector, to thereby identify an atomic arrangement. Ionic species are identified from the flight time taken to reach the two-dimensional detector. Individually detected ions are consecutively detected in a depth direction, and the detected ions are arranged (reconstructed) in the detected order. This provides a three-dimensional atomic distribution. Compared to the concentration measurement with the TEM-EDX, this analysis method can more precisely measure each element concentration in each crystal phase.

The measurement of the element concentration in each phase using the 3DAP is performed in accordance with the following procedure. First, the specimen is diced to thin pieces. From the thin pieces, needle-shaped specimens for pickup atom probe (AP) are prepared using the FIB.

The measurement using the 3DAP is performed on the inside of the sintered body. The measurement of the inside of the sintered body is as follows. First, at a center part of a longest side of a surface having the maximum area, the composition is measured at a surface portion and the inside of the cross section cut perpendicular to the side (in the case of a curved line, perpendicular to a tangent line of the center portion). The measurement location is defined such that, in the cross section, the one-half position of each side is set as a starting point, and a first reference line drawn perpendicular to the side and toward the inside up to the end portion and a second reference line drawn from the center of each corner portion as the starting point at the one-half position of an angle of an inner angle of the corner portion, toward the inside up to the end portion are set, and a position of 1% of lengths of the reference lines from the starting points of the first reference line and second reference line is defined as a surface portion, and a position of 40% is defined as the inside. In the case where the corner portion has a curvature due to chamfering or the like, an intersection point of extended adjacent sides is set as the end portion of the side (the center of the corner portion). In this case, the measurement location is a position not from the intersection point but from a part in contact with the reference line.

By deciding the measurement locations as described above, for example, in the case of the cross section being a square, the reference lines are eight in total including four first reference lines and four second reference lines. The measurement locations are eight locations each at the surface portion and the inside. In this embodiment, the composition is preferably within the above-described range at all the eight locations each at the surface portion and at the inside. However, the composition only needs to fall within the above-described range at least four locations or more each at the surface portion and at the inside. This case does not specify the relationship between the surface portion and the inside on one reference line. The observation plane inside the sintered body specified in this manner is polished and smoothed, and then observed. For example, the observation locations by the TEM-EDX in the concentration measurement are arbitrary 20 points in each phase. An average value of the measured values at these points, excluding the maximum value and the minimum value, is calculated, and the average value is regarded as the concentration of each element. This also applies to the measurement using the 3DAP.

In the measurement result of the concentration in the Cu rich phase using the 3DAP, a sharper concentration profile of Cu in the Cu rich phase is preferable. Specifically, the full width at half maximum (FWHM) of the Cu concentration profile is preferably 5 nm or less. With this Cu concentration profile, a higher coercive force can be obtained. This is because when the Cu distribution in the Cu rich phase is sharp, the magnetic domain wall energy difference steeply appears between the cell phase and the Cu rich phase to cause the magnetic domain wall to be easily pinned.

The full width at half maximum (FWHM) of the concentration profile of Cu in the Cu rich phase is obtained in the following manner. Based on the above-described method, the highest value (PCu) of the Cu concentration is obtained from the Cu profile using the 3DAP. Then, the width of the peak being a half (PCu/2) of the highest value, namely, the full width at half maximum (FWHM) is found. Such measurement is performed for 10 peaks, and the average value of these values is defined as the full width at half maximum (FWHM) of the Cu profile. When the full width at half maximum (FWHM) of the Cu profile is 3 nm or less, the effect of improving the coercive force is more enhanced. When the full width at half maximum is 2 nm or less, a more beneficial effect of improving the coercive force can be obtained.

The diameters of the $Th_2Zn_{17}$ crystal phase, the Cu rich phase such as the $CaCu_5$ crystal phase, the $TbC_{u7}$ crystal phase and the like can be found as follows. In a mapping image of STEM-EDX, an arbitrary phase is selected, and a longest straight line A having both ends in contact with another phase is drawn for the selected phase. Then, at a center point of the straight line A, a straight line B orthogonal to the straight line A and having both ends in contact with another phase is drawn. The average of the lengths of the straight line A and the straight line B is regarded as a diameter D of the phase. By the above procedure, Ds of one or more of arbitrary phases are found. The D is calculated in five visual fields for one sample and the average of the Ds is defined as the diameter (D).

The grain diameter of the crystal grain composed of the $Th_2Zn_{17}$ crystal phase constituting the main phase can be measured by a SEM-electron backscattering pattern (SEM-EBSP) method using a SEM. A procedure of finding the average grain diameter of the crystal grain is described below. First, as a pretreatment, a specimen is embedded in an epoxy resin and subjected to mechanical polishing and buffing, and then subjected to water washing and water spraying by air blow. The specimen after the water spraying is subjected to surface treatment by a dry etching apparatus. Then, the specimen surface is observed under a scanning electron microscope S-4300SE (manufactured by Hitachi High-Technologies Corporation) attached to an EBSD system-Digiview (manufacture by TSL Com). The observation conditions are an acceleration voltage of 30 kV and a measurement area of 500 μm×500 μm. From the observation result, the average grain diameter of the crystal grains existing in the measurement area is found under the following condition. Note that the measurement by the SEM-EBSP can be performed for the inside of the sintered body as with the measurement by the 3DAP.

The orientations of all pixels within a range of the measurement area are measured in a step size of 2 μm, and a boundary of a difference between orientations of adjacent pixels is 5 degrees or more is regarded as a grain boundary phase. However, a crystal grain having less than 5 points as measurement points included in the same crystal grain, and a crystal grain reached the end portion of the range of the measurement area are not regarded as a crystal grain. A grain area is an area in the same crystal grain surrounded by the grain boundary, and an average grain area is an average value of the areas of the crystal grains existing in the range of the measurement area. The grain diameter is a diameter of a perfect circle having the same area as the area in the same crystal grain, and the average grain diameter is the average value of the grain diameters of the crystal grains existing in the range of the measurement area. Note that since the crystal grain having a grain diameter of 10 μm or less is possibly a hetero-phase, the average grain diameter is found ignoring the crystal grain having a grain diameter of 10 μm or less.

Identification of the region constituted of the crystal grains having a diameter of 300 nm or more can be made using, for example, a transmission electron microscope (TEM). The TEM observation is preferably performed with a magnification of 100 k to 200 k. From a TEM image obtained through the TEM observation, crystal grains each composed of a uniform $Th_2Zn_{17}$ crystal phase and having a grain diameter of 300 nm or more are found out. Further, the composition of the element is identified by the TEM-EDX or the like and combined with a crystal system identified from a diffraction image, whereby the $Th_2Zn_{17}$ crystal phase can be identified.

The squareness ratio is defined as follows. First, a DC B-H tracer measures DC magnetization characteristics at room temperature. Then, from the B-H curve obtained from the measurement result, residual magnetization $M_r$, a coercive force $_iHc$, and a maximum energy product (BH)max, which are basic properties of a magnet, are found. At this time, $M_r$ is used to find a theoretical maximum value (BH)max by the following expression (1).

$$(BH)max(\text{theoretical value}) = M_r^2/4\mu_0 \quad (1)$$

The squareness ratio is evaluated from a ratio between (BH)max obtained by the measurement and (BH)max (theoretical value), and is found by the following expression (2).

$$(BH)max(\text{actually measured value})/(BH)max(\text{theoretical value}) \times 100 \quad (2)$$

The permanent magnet is also used, for example, as a bonded magnet. For example, using the above-described permanent magnet for a variable magnet in a variable magnetic flux drive system as disclosed in Japanese Laid-open Patent Publication No. 2008-29148 or Japanese Laid-open Patent Publication No. 2008-43172, enables efficiency improvement, downsizing, and cost reduction of the system. To use the above permanent magnet as the variable magnet, the aging treatment condition needs to be changed, for example, to make the coercive force fall within not less than 100 kA/M nor more than 350 kA/M.

Second Embodiment

The permanent magnet of the first embodiment is usable in various motors and generators. The permanent magnet of the first embodiment is also usable as a stationary magnet and a variable magnet of a variable magnetic flux motor and a variable magnetic flux generator. The permanent magnet of the first embodiment is used to configure the various motors and generators. In applying the permanent magnet of the first embodiment to the variable magnetic flux motor, the techniques disclosed in Japanese Laid-open Patent Publication No. 2008-29148 and Japanese Laid-open Patent Publication No. 2008-43172 are applicable to the configuration of the variable magnetic flux motor and a drive system.

Figure 7:
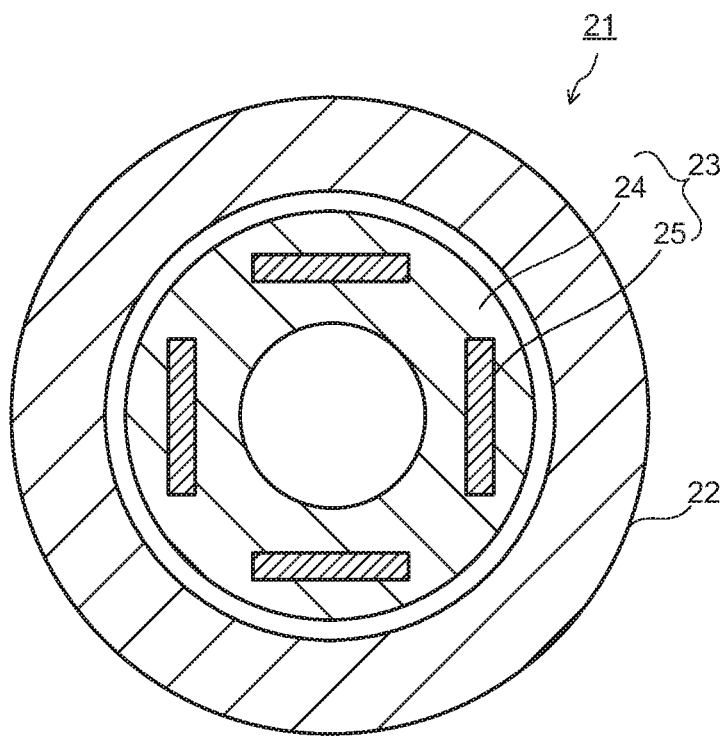
FIG. 7 is a view illustrating a permanent magnet motor.

Next, the motor and the generator including the above permanent magnet will be described referring to the drawings. FIG. 7 is a view illustrating a permanent magnet motor in this embodiment. A permanent magnet motor 21 illustrated in FIG. 7 includes a rotor 23 arranged in a stator 22. In an iron core 24 of the rotor 23, permanent magnets 25 are arranged which are the permanent magnets of the first embodiment. The use of the permanent magnets of the first embodiment can achieve high efficiency, downsizing, and low-cost of the permanent magnet motor 21, based on properties of the permanent magnets and the like.

Figure 8:
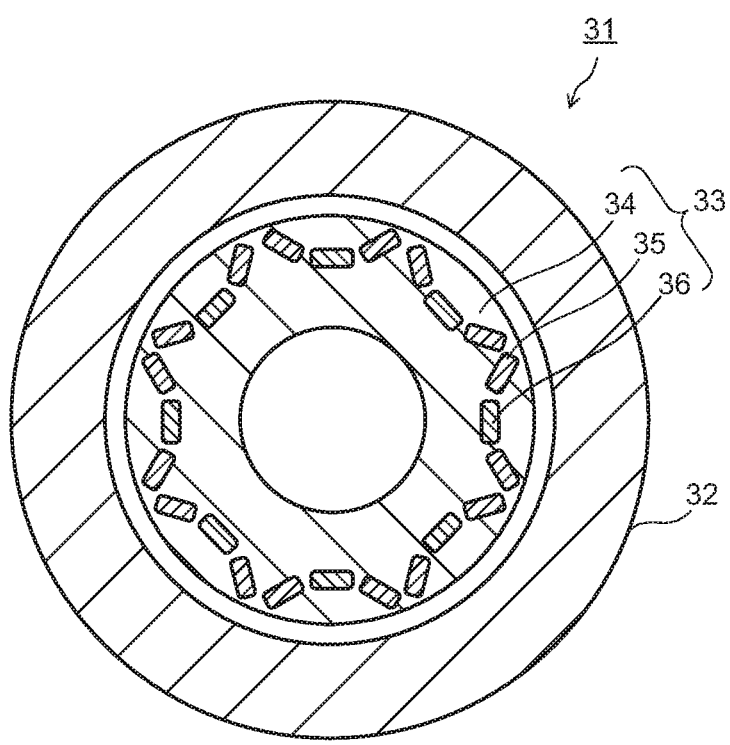
FIG. 8 is a view illustrating a variable magnetic flux motor.

FIG. 8 is a view illustrating a variable magnetic flux motor according to this embodiment. A variable magnetic flux motor 31 illustrated in FIG. 8 includes a rotor 33 arranged in a stator 32. In an iron core 34 of the rotor 33, the permanent magnets of the first embodiment are arranged as stationary magnets 35 and variable magnets 36. A magnetic flux density (flux quantum) of the variable magnet 36 can be variable. Since a magnetization direction of the variable magnet 36 is perpendicular to a Q-axis direction, the variable magnet 36 is not affected by a Q-axis current but can be magnetized by a D-axis current. The rotor 33 includes a magnetization coil (not illustrated). An electric current made flowing from a magnetization circuit to this magnetization coil causes its magnetic field to directly act on the variable magnet 36.

According to the permanent magnet of the first embodiment, the stationary magnet 35 can obtain a suitable coercive force. In the case of applying the permanent magnet of the first embodiment to the variable magnet 36, it is only necessary to control the coercive force, for example, within a range of not less than 100 kA/m nor more than 500 kA/m by changing the above-described various conditions (the aging treatment condition and the like) of the manufacturing method. The variable magnetic flux motor 31 illustrated in FIG. 8 can employ the permanent magnet of the first embodiment for both the stationary magnet 35 and the variable magnet 36, and the permanent magnet of the first embodiment may be used for any one of the magnets. The variable magnetic flux motor 31 can output large torque with a small apparatus size, and is therefore suitable as a motor of a hybrid vehicle, an electric vehicle, or the like required to have a high-output and compact motor.

Figure 9:
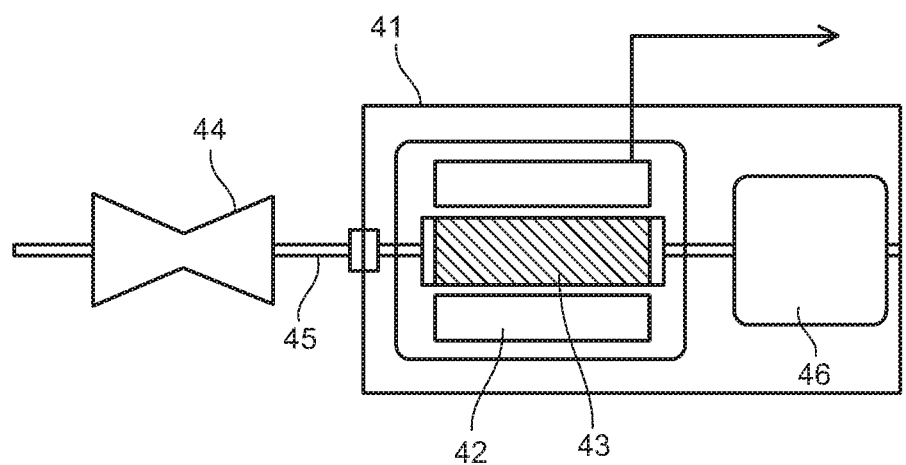
FIG. 9 is a view illustrating a generator.

FIG. 9 illustrates a generator according to this embodiment. A generator 41 illustrated in FIG. 9 includes a stator 42 using the above-described permanent magnet. A rotor 43 disposed inside the stator 42 is coupled, via a shaft 45, to a turbine 44 disposed at one end of the generator 41. The turbine 44 is rotated by, for example, fluid supplied from the outside. Instead of the turbine 44 rotated by the fluid, the shaft 45 can be rotated by transfer of dynamic rotation such as regenerated energy of a vehicle or the like. The stator 42 and the rotor 43 can employ various publicly-known configurations.

The shaft 45 is in contact with a commutator (not illustrated) disposed on the opposite side to the turbine 44 with respect to the rotor 43, so that an electromotive force generated by the rotation of the rotor 43 is boosted to a system voltage and is transmitted as an output from the generator 41 via an isolated-phase bus and a main transformer (not illustrated). The generator 41 may be any of an ordinary generator and a variable magnetic flux generator. The rotor 43 takes an electric charge by static electricity from the turbine 44 and an axial current accompanying power generation. Therefore, the generator 41 includes a brush 46 for discharging the electric charge of the rotor 43.

As described above, the application of the permanent magnet to the generator brings about the effects such as high efficiency, downsizing, and low cost.

While certain embodiments of the present invention have been described, these embodiments have been presented by way of example only, and are not intended to limit the scope of the invention. Indeed, the novel embodiments described herein may be embodied in a variety of other forms. Various omissions, substitutions, changes and modifications may be made to the embodiments described herein without departing from the spirit and scope of the present invention. The appended claims and their equivalents are intended to cover such embodiments and modifications as would fall within the scope and spirit of the invention.

EXAMPLES

In examples, specific examples of the permanent magnet will be described. The composition of magnets in examples and comparative examples is $Sm_{12}Fe_{30}Zr_2Cu_5Co_{51}$.

Example 1 to Example 4

Raw materials used for the permanent magnet were weighed at a prescribed ratio and mixed together, and then melted by arc in an Ar gas atmosphere to prepare an alloy ingot. The alloy ingot was subjected to coarse pulverization and pulverization by a jet mill to prepare an alloy powder as a raw material powder of a magnet. The obtained alloy powder was press-formed in a magnetic field to fabricate a compression molded body.

Next, the compression molded body of the alloy powder having a total weight of 200 g as listed in Table 1 was placed in a mass production sintering furnace chamber, the inside of the chamber was brought into a vacuum state of $9 \times 10^{-2}$ Pa or less, and then the compression molded body was heated up to 1165° C. and held at the reached temperature for 40 minutes as the temporary sintering step. Then, an Ar gas was introduced, and the compression molded body was heated up to 1205° C. in the Ar atmosphere and held at the reached temperature for 6 hours as the main sintering, and thereby was sintered.

Then, the solution heat treatment was performed. In the solution heat treatment, a heat treatment is performed by holding the sintered body at 1145° C. for 4 hours. Thereafter, while the cooling member in the embodiment having the first layer using carbon and the second layer using stainless steel was placed in the chamber in a manner to overlap with the treatment object, the treatment object was transferred together with the cooling member to the outside of the chamber, and cooling was performed until the treatment object reached room temperature. In this event, the cooling rate from 1145° C. ($T_{ST}$) to 945° C. ($T_{ST}$–200° C.) was 5° C./s in Example 1, 7° C./s in Example 2, 10° C./s in Example 3, and 12° C./s in Example 4 as listed in Table 1.

Then, in the chamber, the sintered body after the solution heat treatment was heated up to 750° C. and held at the reached temperature for 2 hours, and then heated up to 845° C. and held at the reached temperature for 25 hours. Thereafter, the sintered body was slowly cooled at a cooling rate of 1.0° C./min down to 400° C., and held at the reached temperature for 1 hour. Thereafter, the sintered body was cooled down to room temperature in the furnace, resulting in a magnet.

Further, composition analysis of the magnet was carried out by an inductively coupled plasma (ICP) method. The composition analysis by the ICP method was carried out in the following procedure. First, a specimen taken from the prescribed measurement location was pulverized in a mortar, and a certain amount of the pulverized specimen was measured by weight and put in a quartz beaker. Further, mixed acid (acid including nitric acid and hydrochloric acid) was put in the beaker. The beaker was heated to approximately 140° C. on a hot plate to completely melt the specimen in the beaker. The specimen was cooled as it was and moved to a PFA-made measuring flask to determine a volume of the specimen, which was used as a specimen solution.

Further, the ICP emission spectrochemical analysis device was used to determine the quantities of components contained in the specimen solution by a calibration curve method. As the ICP emission spectrochemical analysis device, SPS4000 manufactured by SII NanoTechnology Inc. was used. Further, the magnetic property of the permanent magnet was evaluated by a DC B-H tracer, and the coercive force was calculated from the result. Note that HD2300 manufactured by Hitachi High-Technologies Corporation was used as the measuring device in examples and comparative examples.

Example 5

A magnet was obtained by the same method as in Example 1 with the total weight of the compression molded body set to 2000 g (2 kg). The cooling rate from 1145° C. ($T_{ST}$) to 945° C. ($T_{ST}$–200° C.) in the solution heat treatment was 5° C./s. Further, the coercive force was calculated as in other examples.

Comparative Examples 1, 3

Magnets were obtained by the same method as in Example 1 using an experimental furnace equipped with the conventional cooling mechanism as the sintering furnace. The cooling rates from 1145° C. ($T_{ST}$) to 945° C. ($T_{ST}$–200° C.) in the solution heat treatment were 4° C./s and 3° C./s. Further, the coercive force was calculated as in other examples.

Comparative Example 2

A magnet was obtained by the same method as in Example 1 without using the cooling member of the embodiment. The cooling rate from 1145° C. ($T_{ST}$) to 945° C. ($T_{ST}$–200° C.) in the solution heat treatment was 1° C./s. Further, the coercive force was calculated as in other examples.

Reference Example 1

A magnet was obtained by the same method as in Example 1 with the total weight of the compression molded body set to 100 g as listed in Table 1 using an experimental furnace equipped with the conventional cooling mechanism as the sintering furnace. The cooling rate from 1145° C. ($T_{ST}$) to 945° C. ($T_{ST}$–200° C.) in the solution heat treatment was 20° C./s. Further, the coercive force was calculated as in other examples.

The relative ratio of the coercive force in each of the examples and the comparative examples when the coercive force in Reference Example 1 is 1 is listed in Table 1. As is clear from Table 1, it is found that by the permanent magnet manufacturing method using the cooling member of this embodiment, the cooling rate from $T_{ST}$ to $T_{ST}$–200° C. can be made 5° C./s or more even when performing the solution heat treatment on a large amount of sintered body of 200 g or more. Further, increasing the cooling rate in the solution heat treatment can suppress a decrease in coercive force of the permanent magnet to be manufactured.

TABLE 1

| | Total Weight of Compression Molded Body (g) | Cooling Rate (° C./s) | Relative Ratio of Coercive Force |
|---|---|---|---|
| Example 1 | 200 | 5 | 0.85 |
| Example 2 | 200 | 7 | 0.90 |
| Example 3 | 200 | 10 | 0.95 |
| Example 4 | 200 | 12 | 0.99 |
| Example 5 | 2000 | 5 | 0.99 |
| Comparative Example 1 | 200 | 4 | 0.79 |
| Comparative Example 2 | 200 | 1 | 0.45 |
| Comparative Example 3 | 200 | 3 | 0.72 |
| Reference Example 1 | 100 | 20 | 1.0 |

What is claimed is:

1. A method of manufacturing a permanent magnet, comprising:

press-forming alloy powder in a magnetic field to fabricate a compression molded body, wherein a total weight of the compression molded body is not less than 200 g nor more than 2000 g;

sintering the compression molded body to fabricate a sintered body;

performing a solution heat treatment on the sintered body; and performing an aging heat treatment on sintered body after the solution heat treatment, wherein the solution heat treatment includes:

performing a heat treatment on a treatment object having the sintered body at a temperature $T_{ST}$ of 1100 to 1200° C. inside a heating chamber having a heater;

transferring a cooling member into the heating chamber after the heat treatment and placing the cooling member between the heater and the treatment object, the cooling member including a first layer and a second layer on the first layer, the first layer having a first thermal emissivity of 0.5 or more, the second layer having a second thermal emissivity lower of less than 0.5, the first layer containing carbon, a metal carbide, a metal oxide, or a refractory brick, the second layer containing copper, molybdenum, tungsten, titanium, or stainless steel, and the first layer being faced with the treatment object; and transferring the treatment object together with the cooling member to the outside of the heating chamber, and cooling the treatment object until a temperature of the treatment object becomes a temperature lower than a temperature $T_{ST}$–200° C., wherein in cooling the treatment object, a cooling rate until the temperature of the treatment object becomes the temperature $T_{ST}$–200° C. is 5° C./s or more, wherein the cooling rate is achieved by a combination of absorbing, by the first layer, heat emitted by the treatment object and reflecting, by the second layer, heat emitted from the heater, and wherein the permanent magnet is expressed by a composition formula:

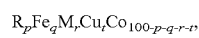

where R represents at least one element selected from the group consisting of rare earth elements, M represents at least one element selected from the group consisting of Zr, Ti, and Hf, p is a number satisfying 10.5≤p≤12.5 atomic percent, q is a number satisfying 27≤q≤40 atomic percent, r is a number satisfying 0.88≤r≤4.5 atomic percent, and t is a number satisfying 4.5≤t≤10.7 atomic percent.

2. The method according to claim 1,
wherein 50 atomic percent or more of the element R in the composition formula is Sm, and
wherein 50 atomic percent or more of the element M in the composition formula is Zr.

3. The method according to claim 1,
wherein the permanent magnet includes a metallic structure having a main phase having a $Th_2Zn_{17}$ crystal phase and a grain boundary phase provided between crystal grains constituting the main phase, and
wherein the main phase has a cell phase having the $Th_2Zn_{17}$ crystal phase and a Cu rich phase having a $CaCu_5$ crystal phase.

4. The method according to claim 1,
wherein the permanent magnet includes a metallic structure, 90 vol % or more of the metallic structure being the $Th_2Zn_{17}$ crystal phase and the $CaCu_5$ crystal phase, and
wherein less than 5 vol % of the crystal grains is composed of crystal grains having a diameter of 300 nm or more and consisting of the $Th_2Zn_{17}$ crystal phases.

* * * * *